United States Patent [19]
Gurman

[11] 3,928,921
[45] Dec. 30, 1975

[54] MULTI-MAGNETIC LAYER TEACHING AID

[75] Inventor: Norman R. Gurman, Englewood Cliffs, N.J.

[73] Assignee: Noray Unlimited, Inc., Englewood, N.J.

[22] Filed: Apr. 8, 1974

[21] Appl. No.: 458,860

Related U.S. Application Data

[63] Continuation of Ser. No. 313,803, Dec. 11, 1972, abandoned.

[52] U.S. Cl. ................................. 35/7 A; 40/142 A
[51] Int. Cl.² ......................................... G09B 29/00
[58] Field of Search ............ 35/7 A, 26, 27, 28, 73, 35/29 R; 40/142 A, 160, 135; 46/DIG. 1

[56] References Cited
UNITED STATES PATENTS

| | | | |
|---|---|---|---|
| 2,282,871 | 5/1942 | Malbon | 35/73 |
| 2,634,132 | 4/1953 | Freedman | 35/26 |
| 3,080,664 | 3/1963 | Bland | 35/7 A |
| 3,226,838 | 1/1966 | Courrege et al. | 40/142 A |
| 3,274,706 | 9/1966 | Friend | 46/DIG. 1 |
| 3,423,846 | 1/1969 | Arend | 35/7 A |
| 3,456,373 | 7/1969 | Epton | 40/142 A |
| 3,651,592 | 3/1972 | McCormick et al. | 40/142 A |
| 3,704,531 | 12/1972 | Seals | 35/26 |
| 3,824,712 | 7/1974 | Powell | 35/26 |

FOREIGN PATENTS OR APPLICATIONS

| | | | |
|---|---|---|---|
| 1,091,357 | 11/1967 | United Kingdom | 40/142 A |
| 1,288,048 | 2/1962 | France | 35/7 A |

*Primary Examiner*—John H. Wolff
*Attorney, Agent, or Firm*—Philip D. Amins

[57] ABSTRACT

A teaching aid is disclosed comprising a magnetic medium backing sheet covered in vinyl and having a partial picture on its front surface. A plurality of picture layers each having magnets on their rear surfaces can be assembled one on top of another to present a complete three dimensional graphic. In addition alternative frameworks are disclosed to facilitate use and handling of the aid.

5 Claims, 8 Drawing Figures

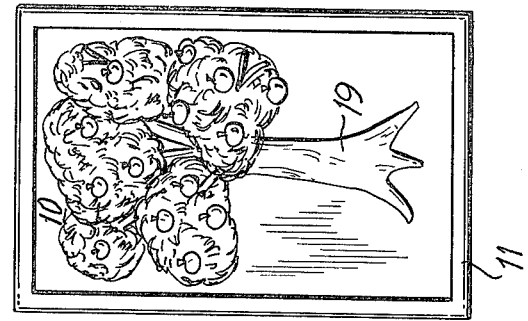
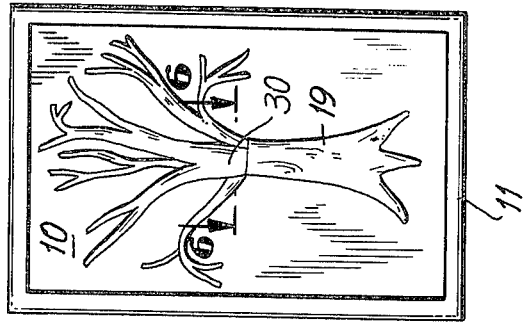
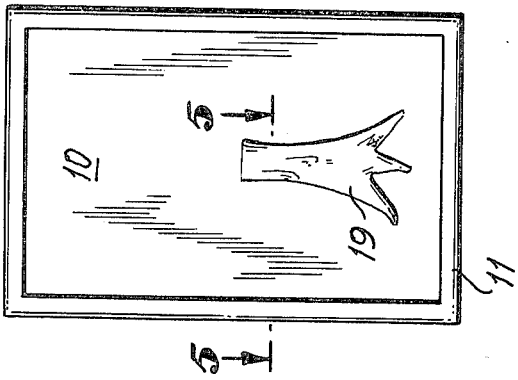

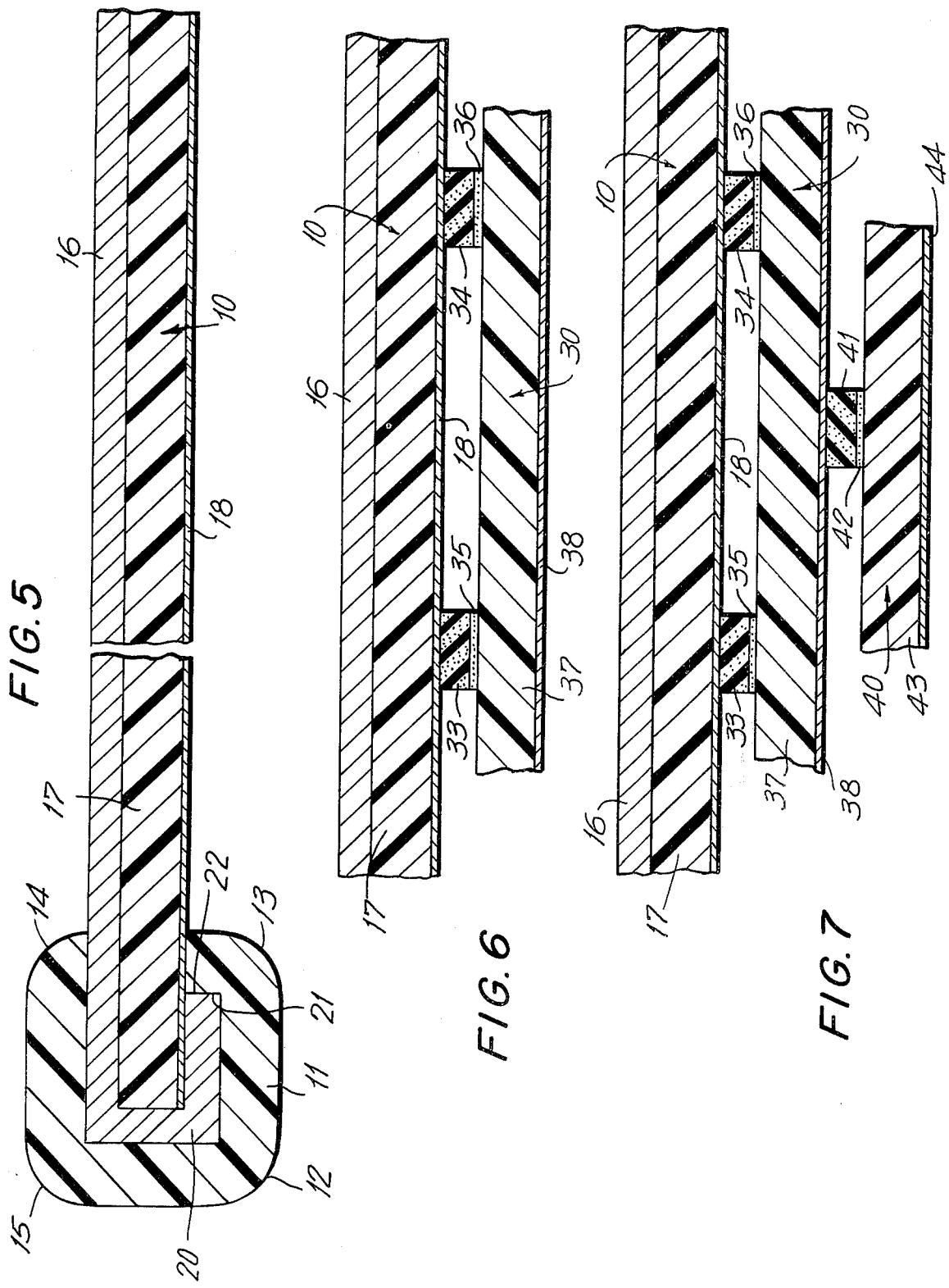

MULTI-MAGNETIC LAYER TEACHING AID

This is a continuation of application Ser. No. 313,803 filed Dec. 11, 1972, now abandoned.

BACKGROUND OF THE INVENTION

This invention relates to graphic teaching aids and in particular to a multi-layer magnetic picture medium.

Today, in the midst of social and technological explosions in various fields of knowledge, as well as in the techniques by which this burgeoning knowledge is communicated, the teacher can no longer attempt to be the sole information-giving instrument in the classroom. Indeed, the teacher himself can no longer keep pace with the expanding world of information. Further, the growing school population and its concomitantly larger and more diverse variety of classes makes it increasingly more difficult for a single teacher to reach individual pupils with traditional classroom information-giving methods. Moreover, these methods fail to compete with the increasing variety of up-to-date communication techniques to which pupils are exposed outside of school, and even long before they enter school. In other words, in our truly remarkable age, the task of effective teaching becomes ever more difficult.

Ironically, the increasingly difficult task that confronts today's teacher is further complicated by the mushrooming availability of new and novel educational media. A sizeable portion of these depend in large part on reading skills for interpretation. It is an object of the present invention to eliminate the needs for such skills and to produce a more elementary teaching aid which takes advantage of a students observations outside of a school environment.

In the learning process, all of our human perceptor sensory mechanisms are in continual contact with our world of things and events. However, by themselves the eyes, ears, etc., do nothing more than feed us data-sensory impressions-and thus, alone, they are not responsible for the coherent "pictures" we see of the object and events that take place in the outer world.

Accordingly, it is the primary object of the present invention to furnish a teaching aid device which is manipulated by the students and which tends to organize the sensory impressions thereby leading to an organized thought pattern.

SUMMARY OF THE INVENTION

The foregoing and other objects are accomplished in accordince with an illustrative embodiment of the invention which comprises a three dimensional graphic teaching aid. The teaching device comprises in general terms a magnetic medium, such as steel or iron, upon a front surface of which is inscribed, or painted, a portion of the picture of a scene or device. To complete the picture, the student places multiple layers of magnetic-backed materials upon this front surface. Thus, the device permits the use of two and three dimensional materials which adhere to and can be readily moved about on the undersurface by means of miniature magnets affixed to the materials.

The surface of the medium is composed of a plastic, such as vinyl, or can be composed of fine textured, permanently colored particles of vitreous material if it is desired to use chalk in addition to the multiple layers. Vinyl is an excellent material for resistance to wear and abuse. Upon the vinyl or vitreous materials, the portion of the picture is painted.

Each layer can be made from sheet vinyl cut to the desired shape and bearing the desired picture image necessary to complete the scene partially drawn on the medium surface. On the rear of each layer is a miniature magnetic which is adhesively secured to the vinyl. Dependent upon the size and weight of each layer piece, one or more magnets can be secured thereto. Advantageously, the use of vinyl in these layers enables many layers to be applied one upon another and, yet share the common magnetic medium of the subsurface. This is true even though miniature magnets are employed.

A particular feature of my invention resides in the manufacture of the subsurface or backing sheet. I have determined that from the point of view of concentrating the students interest and focusing his attention, the backing sheet should be framed. This helps the beginner student to understand the bounds of his work product. I have decided that framing can be readily accomplished by a soft vinyl sheet which is adhered to the rear surface of the backing sheet in such a way as to have its edges protrude beyond the backing sheet on all sides. Then, the sheet can be wrapped over the sandwich edges of the medium and laid against the front surface to form the framework outline.

BRIEF DESCRIPTION OF THE DRAWINGS

The foregoing objects, features, and advantages of the present invention will become more apparent from the detailed description hereinafter considered in conjunction with the accompanying drawings wherein:

FIG. 1 depicts a framed backing sheet upon which a portion of a tree scene is painted;

FIG. 2 shows the same backing sheet depicted in FIG. 1 and in addition a first layer of picture detail;

FIGS. 3 & 4 each depict successive stages of layering improving upon the picture shown in FIG. 2;

FIG. 5 is a cross sectional view taken along section line 5—5 of FIG. 1 exposing for examination the framework and sandwich construction of the backing sheet;

FIG. 6 is a cross-sectional view taken along section line 6—6 of FIG. 2 showing the first dimensional layer;

FIG. 7 is a cross-sectional view taken along section line 7—7 of FIG. 3 showing the first and second layers of the picture; and FIG. 8 is a cross-sectional view of an alternative framework construction.

DETAILED DESCRIPTION OF THE PREFERRED EMBODIMENTS

With reference to FIGS. 1 and 5, the construction of the backing sheet 10 will be initially considered. As may be seen in FIG. 1 a rectangular framework 11 surrounds backing sheet 10. In cross-section the corners 12, 13, 14 and 15 of framework 11 are rounded to facilitate handling of the sheet 10. The backing sheet 10 as seen in FIG. 5 actually comprises three sandwiched layers; i.e. a rear or back layer of galvanized steel or iron, which serves as the magnetic medium layer 16, a vinyl layer 17 and a pictorial layer 18 which contains part of a picture. In the illustration of FIG. 1 the scene is of a tree trunk 19 which is completed layer by layer until as seen in FIG. 4, an apple tree is depicted.

Returning once more to FIG. 5, it will be observed that the three layers which comprise backing sheet 10 are held in close contact by wrapping the edge 20 of medium 16 about the sandwich edges of these layers.

Although only the left side of framework 11 is shown in FIG. 5 it will be appreciated that the remaining three sides of backing sheet 10 are similarly constructed. Framework 11 is made with a locking surface 22 which contacts edge surface 21 to hold framework 11 in position. Advantageously, framework 11 can be extruded from flexible vinyl or a rubberized compound, stretched over sheet 10 and locked in place by the aforementioned contacting surfaces.

Next, attention is directed to the application of multiple layers upon backing sheet 10 as well as the construction of each layer. The first layer 30 is shown in FIG. 2 and contains a picture of the branches and upper trunk of a tree. In FIG. 6 the cross-section taken along section lines 6—6 shows greater detail of layer 30. The layer 30 comprises a relatively thick vinyl layer 37 and pictorial layer 38 on its front surface. On the rear surface of layer 30 magnets 33 and 34 and adhesively affixed thereto by thin adhesive layers 35 and 36. It is to be noted that the magnetic attraction between magnets 33 and 34 and magnetic medium layer 16 holds the first layer in position.

The second as well as successive layers are illustratively depicted in FIGS. 3 and 7. FIG. 3 enhances the picture in FIG. 2 with details of the tree such as the foliage. FIG. 7 demonstrates how the second layer is magnetically fastened to backing sheet 10 via layer 30. The second layer 40 is constructed identical to layer 30 and it comprises vinyl layer 43 and pictorial layer 44. On the rear of layer 40 magnet 41 is fastened with a layer of adhesive 42.

Having thus considered in detail the manner of constructing and using the multi-layer graphic teaching aid, attention is now directed to the alternative method of framing backing sheet 10, as showin in FIG. 8. It will be recalled that the backing sheet is a three layered arrangement which is depicted as layers 17, 18 and 51. In the framework shown in FIG. 5 magnetic medium 16 was wrapped about the sandwich edges of the three layers. In this alternative embodiment, the magnetic medium layer 51 is a rectangular sheet of substantially the same dimension as layers 17 and 18. Here a fourth layer, layer 52 of soft vinyl, has an extended portion 53 beyond all edges (only one edge shown) of backing sheet 10. Portion 53 is wrapped about the exposed edges of layers 17, 18 and 51 forming a U-shaped edge to hold the layers in position. It also forms a framework with surface 56 viewable from the front and side 55, for example, covering the edges. Vinyl also quite naturally forms smooth corners 54 and 57 to aid in handling the backing sheet.

The foregoing is considered to be only exemplary of my invention. For example, it is considered to be within the scope of my invention to reverse the structure so that a permanent magnet, or an electrically induced magnet, is made a part of the backing sheet, so that each layer is a magnetic medium. While I have shown and described the preferred embodiment of the invention, it will be apparent to those skilled in the art that there are various modifications, changes and improvements which may be made without departing from the spirit and scope of the invention.

What is claimed is:

1. A multi-layer teaching aid for visual presentation of a predetermined scene comprising,
    a backing substrate having a portion of said scene on the front surface thereof,
    a plurality of substantially flat add-on layers having magnetic means on the rear surface thereof and a pictorial representation on the front surface thereof,
    each of said layers being juxtaposable in a superimposed relationship upon said substrate and upon one another,
    each of said layers and said pictorial representations thereon forming a different pictorial representation which incorporates the features of the scene of the substrate when said layers are superimposed upon said substrate,
    said substrate in conjunction with all of said add-on layers in juxtaposed superimposed relationship with said substrate scene providing the composite pictorial representation comprising said predetermined scene,
    said backing substrate comprising at least one contiguous metal stratum capable of acting as a medium for magnetic flux lines, and
    a framework fitted about the periphery of said backing substrate for facilitating the handling thereof and for containing the strata thereof,
    whereby a three dimensional view is achieved by applying successive of said layers of magnetic backed material upon the backing substrate which serves as a common medium for the magnetic flux lines of the various layers.

2. A multi-layer teaching aid in accordance with claim 1, wherein
    said framework is contiguous with the rear stratum of said backing substrate.

3. A multi-layer teaching aid in accordance with claim 1, wherein
    said backing substrate is of substantially rectangular configuration and said portion of the scene is disposed on the front stratum thereof, and
    said front stratum is fabricated of a plastic material.

4. A multi-layer teaching aid in accordance with claim 2. wherein
    said metal stratum extends beyond the periphery of said substrate, and
    the extending edges of said metal stratum are wrapped about the peripheral edges of said strata to form said framework.

5. A multi-layer teaching aid in accordance with claim 4, wherein
    said framework includes internal locking type surfaces about the perimeter thereof, and
    said locking type surfaces engage said extending edges of said metal stratum.

* * * * *